US011732711B2

(12) United States Patent
Tanida et al.

(10) Patent No.: US 11,732,711 B2
(45) Date of Patent: Aug. 22, 2023

(54) EXTERNAL GEAR PUMP

(71) Applicant: IHI Corporation, Tokyo (JP)

(72) Inventors: Masahiro Tanida, Tokyo (JP); Takashi Sato, Tokyo (JP); Kenji Takamiya, Tokyo (JP); Akihiro Shimamura, Tokyo (JP); Naoki Seki, Tokyo (JP)

(73) Assignee: IHI Corporation, Tokyo (JP)

( * ) Notice: Subject to any disclaimer, the term of this patent is extended or adjusted under 35 U.S.C. 154(b) by 103 days.

(21) Appl. No.: 17/443,856

(22) Filed: Jul. 28, 2021

(65) Prior Publication Data

US 2021/0355939 A1 Nov. 18, 2021

Related U.S. Application Data

(63) Continuation of application No. PCT/JP2020/014772, filed on Mar. 31, 2020.

(30) Foreign Application Priority Data

May 30, 2019 (JP) ................................. 2019-101077

(51) Int. Cl.
*F04C 15/00* (2006.01)
*F04C 2/18* (2006.01)

(52) U.S. Cl.
CPC ............ *F04C 2/18* (2013.01); *F04C 2240/30* (2013.01); *F04C 2240/56* (2013.01); *F04C 2240/60* (2013.01)

(58) Field of Classification Search
CPC ......... F04C 15/0088; F04C 15/00; F04C 2/18
See application file for complete search history.

(56) References Cited

U.S. PATENT DOCUMENTS 4,090,820 A * 5/1978 Teruyama ........... F04C 15/0088
418/79
2009/0311120 A1 12/2009 Okada

FOREIGN PATENT DOCUMENTS

| CN | 201212474 Y | 3/2009 |
| JP | 50-156006 A | 12/1975 |
| JP | 58-151386 U | 10/1983 |

(Continued)

OTHER PUBLICATIONS

International Search Report dated Jun. 9, 2020 in PCT/JP2020/014772 filed on Mar. 31, 2020, 3 pages.

*Primary Examiner* — Deming Wan
(74) *Attorney, Agent, or Firm* — Oblon, McClelland, Maier & Neustadt, L.L.P.

(57) ABSTRACT

In an external gear pump, a first bushing of a rotational shaft of a first gear has a second surface facing to a first surface of a pump body. A recess for supplying high-pressure lubricating oil between an inner circumferential surface of the first bushing and an outer circumferential surface of the rotational shaft is opened on the inner circumferential surface within a low pressure range associating with an inlet chamber of fluid. A bushing-side supply passage for supplying the high-pressure lubricating oil to the recess is formed within the first bushing. A bushing-side inlet port of the bushing-side supply passage is opened on the second surface within a high pressure range associating with an outlet chamber of the fluid. A body-side supply passage for supplying the high-pressure lubricating oil to a body-side supply port opened on the first surface is formed within the pump body.

7 Claims, 8 Drawing Sheets

(56) References Cited

FOREIGN PATENT DOCUMENTS

| | | |
|---|---|---|
| JP | 04-006785 U | 1/1992 |
| JP | 10-122160 A | 5/1998 |
| JP | 11-050973 A | 2/1999 |
| JP | 2008-038769 A | 2/2008 |
| WO | WO 2007/096943 A1 | 8/2007 |
| WO | WO 2018/019587 A1 | 2/2018 |

\* cited by examiner

EXTERNAL GEAR PUMP

CROSS REFERENCE TO RELATED APPLICATIONS

This application is a continuation application of International Application No. PCT/JP2020/014772, filed on Mar. 31, 2020, which claims priority to Japanese Patent Application No. 2019-101077, filed on May 30, 2019, the entire contents of which are incorporated by reference herein.

BACKGROUND

1. Technical Field

The present disclosure relates to an external gear pump.

2. Description of the Related Art

Japanese Patent Application Laid-Open No. 2008-38769 discloses an external gear pump. The external gear pump includes a pair of a driving gear and a driven gear within its pump body. Gear teeth are formed on each outer circumference of the driving gear and the driven gear. The driving gear and the driven gear are sandwiched by plates from both sides in their axial direction in a state where they are meshed with each other. An inlet chamber into which fluid (liquid) is supplied is formed on one side of the meshed portion of the driving gear and the driven gear, and an outlet chamber from which the fluid is discharged is formed on the other side of the meshed portion. The outer circumferential portions of the driving gear and the driven gear are also surrounded by the pump body with the exception of the inlet chamber and the outlet chamber.

The fluid doesn't flow through the meshed portion from the inlet chamber to the outlet chamber, and is delivered by the gear teeth of the driving gear and the driven gear from the inlet chamber to the outlet chamber along their circumferential direction. In other words, the external gear pump is a positive displacement pump. The pressure of the fluid in the outlet chamber is higher than the pressure of the fluid in the inlet chamber due to flow resistance on a side of the outlet chamber and so on. Thus, the external gear pump raises the pressure of the fluid.

SUMMARY

Each rotational shaft of the driving gear and the driven gear is held rotatably by bushings. Lubricating fluid is supplied between the outer circumferential surfaces of the rotational shafts and the inner circumferential surfaces of the bushings (sliding surfaces) to reduce a load acting on the rotational shafts. It is common that the fluid delivered by the gear pump is uses as the lubricating fluid. It is desired to supply high pressure lubricating oil stably to the sliding surfaces of the bushings. By supplying the high pressure lubricating oil stably to the sliding surfaces, a tolerance against the load acting on the rotational shafts and the bushings can be made large.

An object of the present disclosure is to provide an external gear pump that can enlarge a tolerance against a load acting on its rotational shaft and its bushing.

An aspect of the present disclosure provides an external gear pump that increases a pressure of fluid and discharge the fluid, the pump comprising: a pair of a first gear and a second gear; a pump body; a gear accommodation chamber that is formed within the pump body and accommodates the first gear and the second gear in a meshed state: a pair of a first bushing and a second bushing that are hollow cylindrical and hold a rotational shaft of the first gear rotatably; an inlet chamber that is formed within the pump body on one side of a meshed portion of the first gear and the second gear; and an outlet chamber that is formed within the pump body on another side of the meshed portion, wherein a low pressure range facing to the inlet chamber and a high pressure range facing to the outlet chamber are segmented along an inner circumference of the gear accommodation chamber that associates with an outer circumference of the first gear, wherein the pump body has a first surface that faces to the first bushing and is perpendicular to the rotational shaft of the first gear, wherein the first bushing has a second surface that faces to the first surface and is perpendicular to the rotational shaft, wherein a recess for supplying lubricating oil between an inner circumferential surface of the first bushing and an outer circumferential surface of the rotational shaft is opened on the inner circumferential surface within the low pressure range, wherein a bushing-side supply passage that connects a bushing-side inlet port opened on the second surface within the high pressure range with the recess is formed within the first bushing, and wherein a body-side supply passage that connects the outlet chamber with a body-side supply port opened on the first surface within the high pressure range is formed within the pump body.

The bushing-side inlet port and the body-side supply port may be arranged so as to face each other.

Here, a rotational shaft of the second gear may be also rotatably held by a first bushing and a second bushing that are hollow cylindrical, wherein the first bushing of the second gear may be configured symmetrically to the first bushing of the first gear with respect to a symmetrical plane that is located at a center between the first gear and the second gear and is parallel to the rotational shaft, and wherein the body-side supply port may be disposed so as to face to both of the bushing-side inlet port of the first bushing of the first gear and the bushing-side inlet port of the first bushing of the second gear.

An orifice may be formed at an end of the bushing-side supply passage on a side of the recess.

The bushing-side supply passage may be passed through to an outer circumferential surface of the first bushing.

A plurality of spring accommodation holes may be formed on the second surface of the first bushing of the first gear, each of the spring accommodation holes accommodating a coil spring that urges the first bushing in a direction away from the first surface facing to the second surface.

A pass through groove may be formed on the inner circumferential surface of the first bushing of the first gear from one end to another end of the inner circumferential surface at an opposite position to the recess with respect an axial center of the rotational shaft.

According to the aspect, a tolerance against a load acting on the rotational shaft and the bushing can be made large.

DESCRIPTION OF THE EMBODIMENT

Hereinafter, an external gear pump (merely called as the gear pump, hereinafter) P according to the present embodiment will be explained with reference to the drawings. The gear pump P is used as a pump for delivering liquid fuel to an engine. In the gear pump P, this liquid fuel (also merely called as the fuel, hereinafter) is also utilized as lubricating liquid (also merely called as the lubricating oil) that lubricates various portions of the gear pump P. Thus, the fuel and the lubricating oil are identical to each other in the present embodiment. Depending on contents of explanations, both terms, the fuel (the fluid delivered by the pump) and the lubricating oil (the fluid for lubrication), are used hereinafter.

Figure 1:
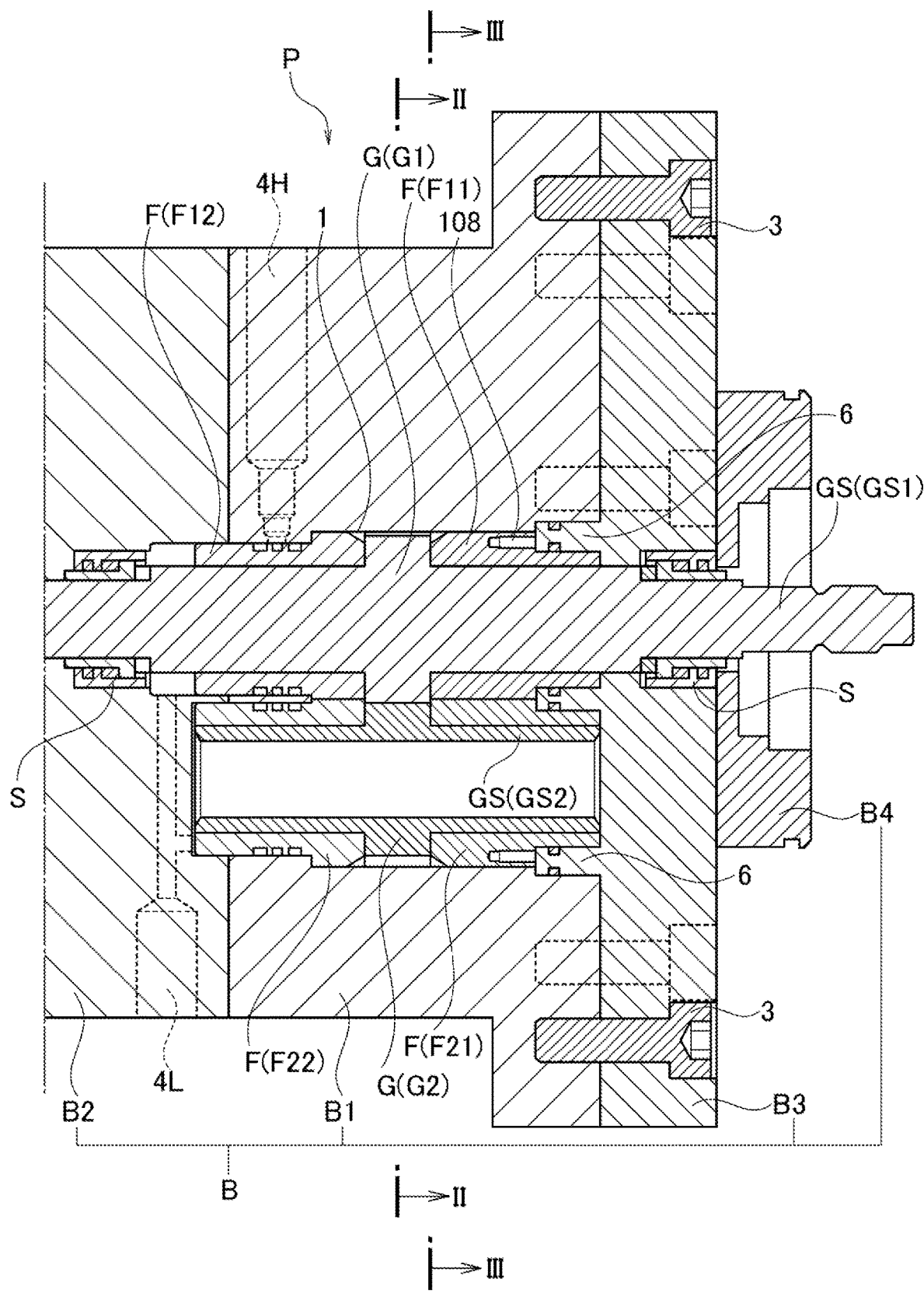
FIG. 1 is a cross-sectional view of an external gear pump according to an embodiment.
Figure 2:
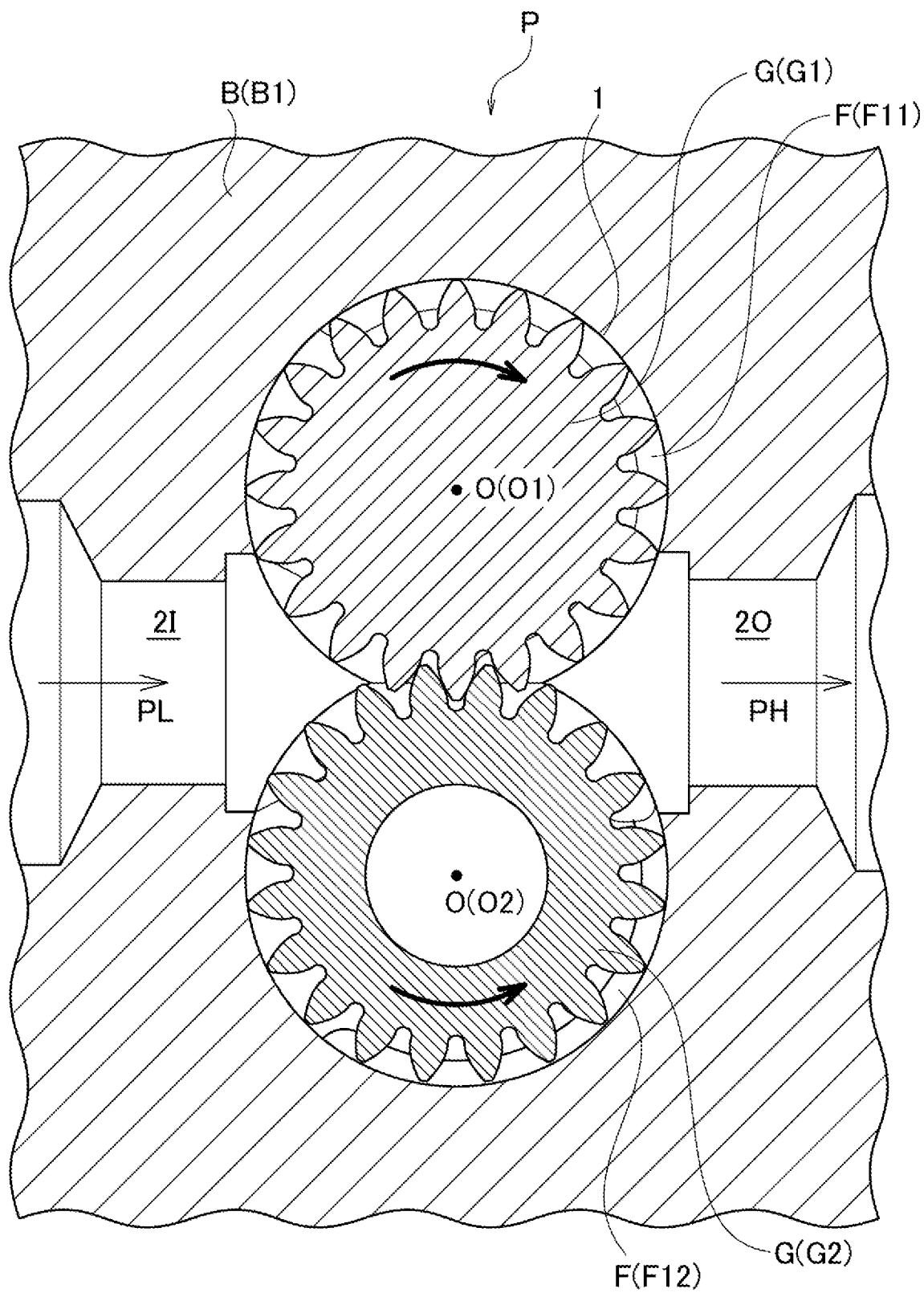
FIG. 2 is a cross-sectional view taken along a line II-II shown in FIG. 1.

As shown in FIG. 1 and FIG. 2, the gear pump P includes a pair of gears G within its pump body B. The pump body B is configured of a main body B1, a side plate B2, a mid plate B3 and an end plate B4 in the present embodiment. A gear accommodation chamber 1 that accommodates the pair of the gears G in a state where they are meshed with each other is formed within the main body B1. The gear accommodation chamber 1 has an 8-shaped cross-section on a cross-sectional plane perpendicular to rotational axes O of the gears G.

Although the gears G will be explained later in detail, plural gear teeth are formed on each outer circumference of the gears G. Distal ends of the gear teeth slidably contact with the inner circumferential surfaces of the gear accommodation chamber 1 with a lubricating oil film formed therebetween. An inlet chamber 2I to which the fuel is supplied is formed on one side of the constriction portion of the gear accommodation chamber 1, i.e. the meshed portion of the gears G, and an outlet chamber 2O is formed on the other side thereof. The fuel discharged from the gear pump P is discharged from the outlet chamber 2O. The gear pump P is a positive displacement pump, and the pressure PH in the outlet chamber 2O is higher than the pressure PL in the inlet chamber 2I (PL<PH) due to flow resistance on a side of the outlet chamber 2O and so on. Thus, the gear pump P increases a pressure of the fuel and discharge the fuel.

The side plate B2 and the mid plate B3 are fixed with the main body B1 by bolts 3 or the like from both sides in a direction of the above-mentioned rotational axes O, respectively (bolts on a side of the side plate B2 are not shown in the drawings). Both ends of each rotational shaft GS of the gears G are rotatably held by the side plate B2 and the mid plate B3, respectively, via after-explained hollow cylindrical bushings F. Note that the bushings F will be also explained later in detail, but each of the bushings F constitutes a liquid bearing that utilizes the oil film (liquid film) formed between its inner circumferential surface 100 (see FIG. 4 to FIG. 6) and the outer circumferential surface of the rotational shaft (s) GS. The ring-shaped end plate B4 is fixed on the outer side surface of the mid plate B3. The rotational shaft GS (GS1) of the one (first gear G1) of the paired gears G is extended out from the center of the end plate B4.

The one (first gear G1) of the paired gears G is a driving gear rotated by external power. Splines are formed on one end of the rotational shaft GS1 of the first gear G1 (see FIG. 8), and the first gear G1 is connected with its drive source via the splines. The other (second gear G2) of the paired gears G is a driven gear that is rotated along with the rotations of the first gear G1. The first gear G1 and the second gear G2 rotate in opposite directions to each other as shown by arrows in FIG. 2. Gear profiles (the shape and the numbers of the gear teeth and so on) of the first gear G1 and the second gear G2 are identical to each other. The fuel in the inlet chamber 2I is carried along the inner circumferential surface of the gear accommodation chamber 1 in a state where it is held between the gear teeth of the first gear G1 and the second gear G2 to be delivered to the outlet chamber 2O.

The rotational shaft GS1 of the first gear G1 is a solid circular shaft, and is formed monolithically with the first gear G1 so as to penetrate the first gear G1. Oil seals S for preventing leakage of the lubricating oil while allowing the rotations of the rotational shaft GS1 are provided between the rotational shaft GS1 and the side plate B2 and between the rotational shaft GS1 and the mid plate B3, respectively. On the other hand, the rotational shaft GS2 of the second gear G2 is a hollow circular shaft, and is formed monolithically with the second gear G2 so as to penetrate the second gear G2. Both ends of the rotational shaft GS2 are held by the side plate B2 and the mid plate B3, respectively, via the bushings F. The lubricating oil can flow through the inside of the rotational shaft GS2.

Figure 3:
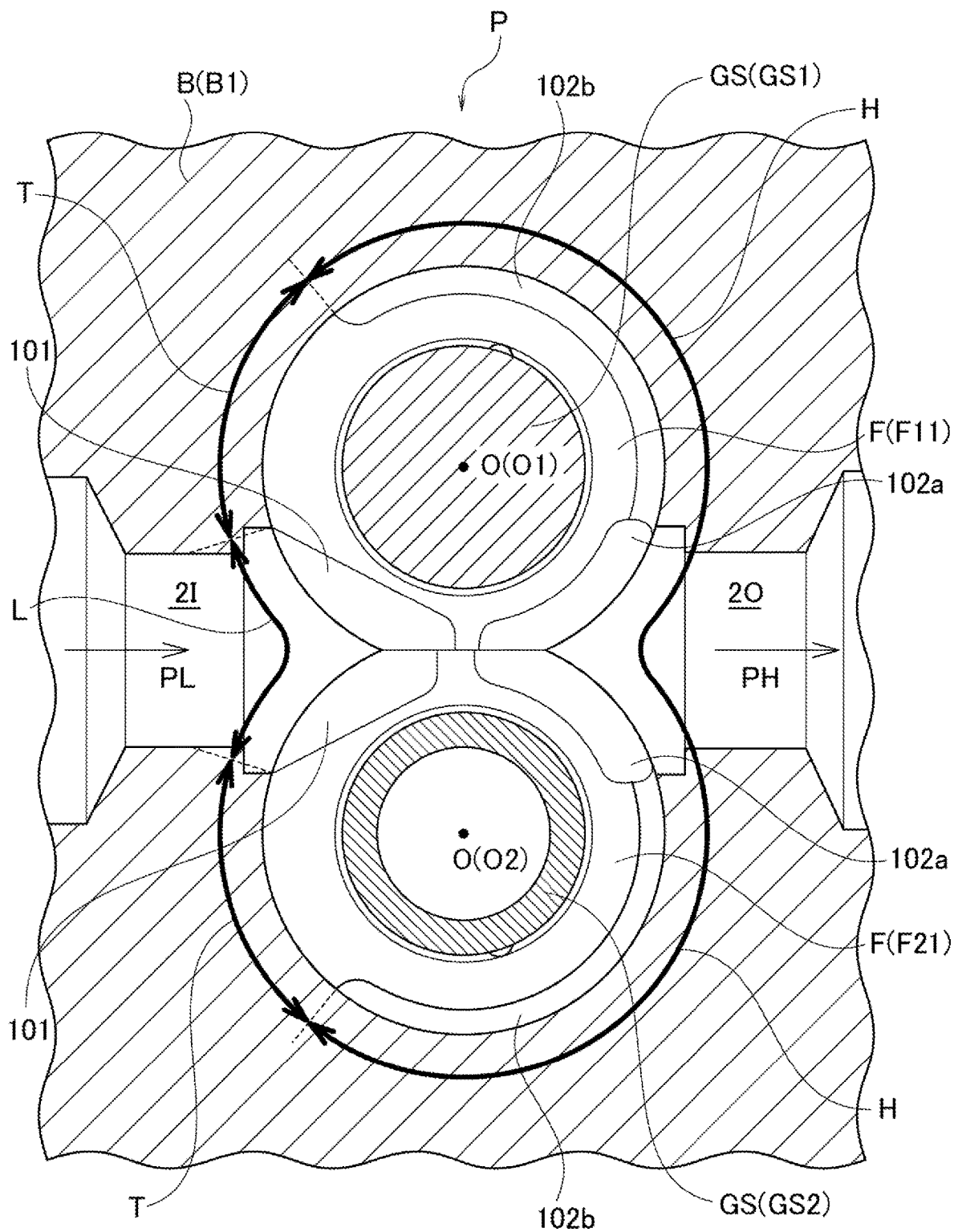
FIG. 3 is a cross-sectional view taken along a line III-III shown in FIG. 1.

A portion of the rotational shaft GS1 of the first gear G1 on a side of the mid plate B3 is held by the first bushing F11, and its portion on a side of the side plate B2 is held by the second bushing F12. Similarly, a portion of the rotational shaft GS2 of the second gear G2 on a side of the mid plate B3 is held by the first bushing F21, and its portion on a side of the side plate B2 is held by the second bushing F22. The first bushing F11 of the first gear G1 and the first bushing F21 of the second gear G2 are configured symmetrically to each other with respect to a symmetrical plane that is located at the center between the first gear G1 and the second gear G2 and is parallel to the rotational shafts GS (the rotational axes O) as shown in FIG. 3. However, with respect to the first bushing F11 of the first gear G1 and the first bushing F21 of the second gear G2, shapes of their low pressure depressed portions 101 and high pressure depressed portions 102*a* that will be explained later are slightly different from each other, respectively.

Figure 4:
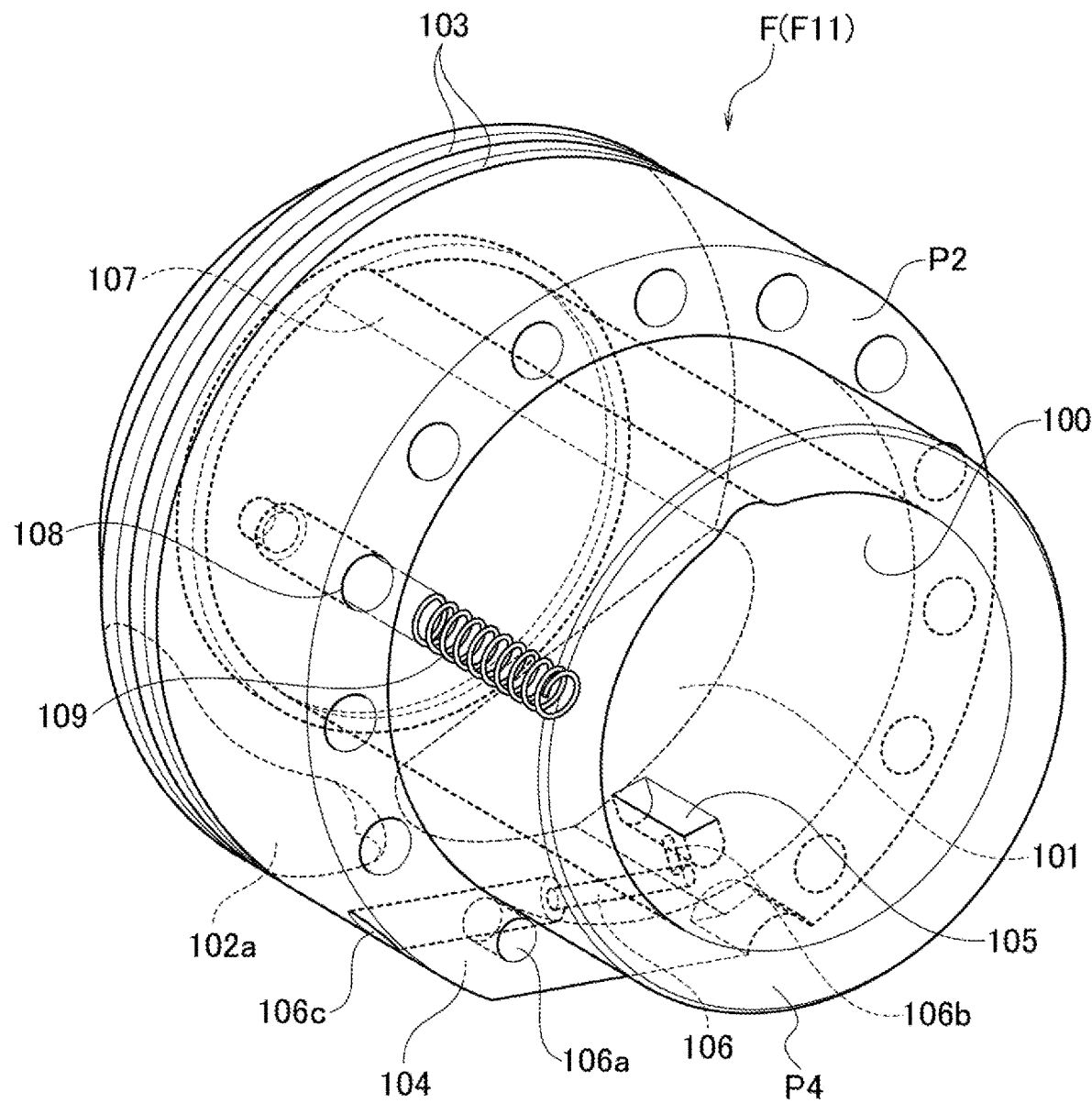
FIG. 4 is a perspective view of a bushing of the gear pump (its front side)
Figure 5:
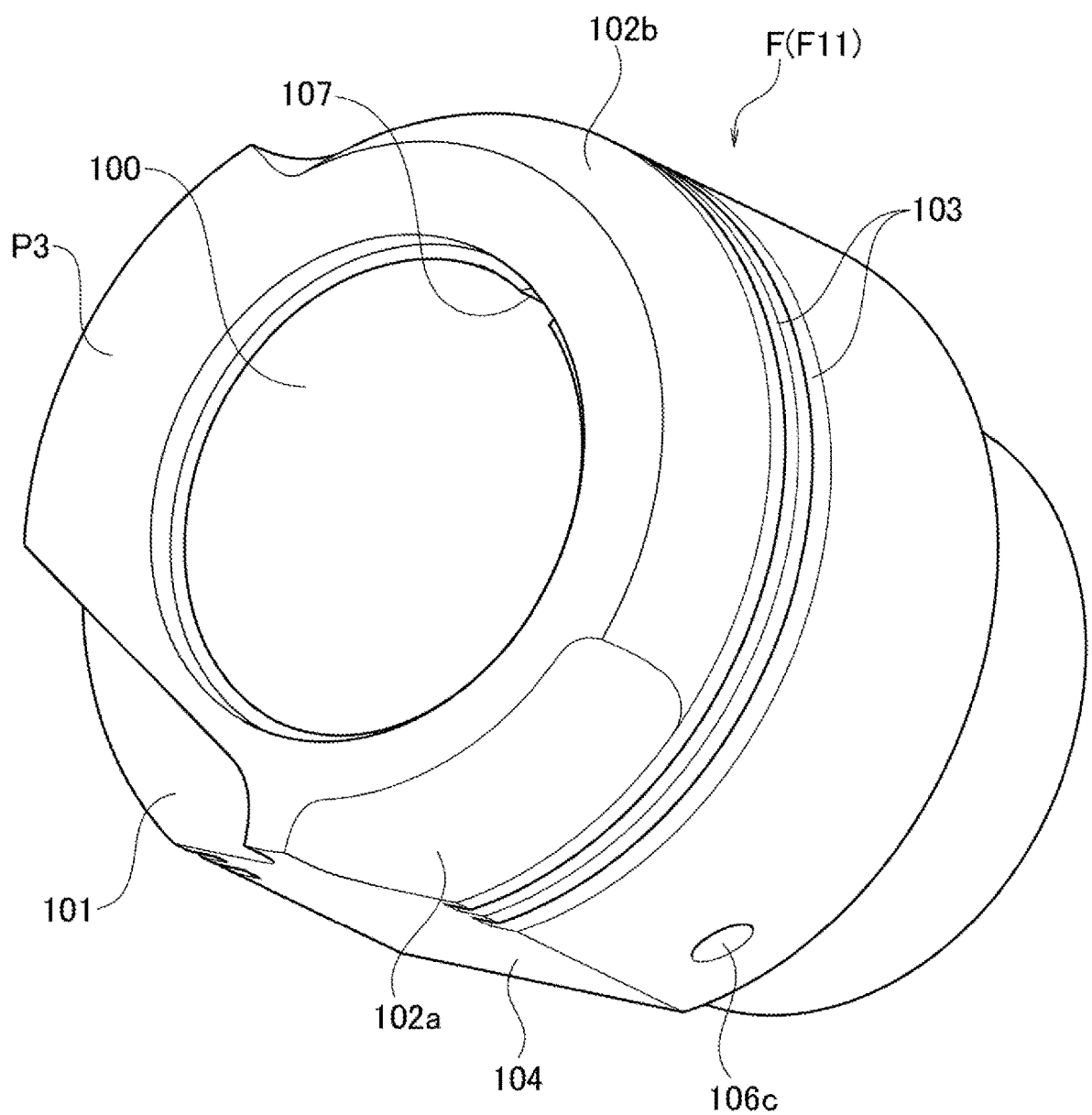
FIG. 5 is a perspective view of the bushing of the gear pump (its back side)
Figure 6:
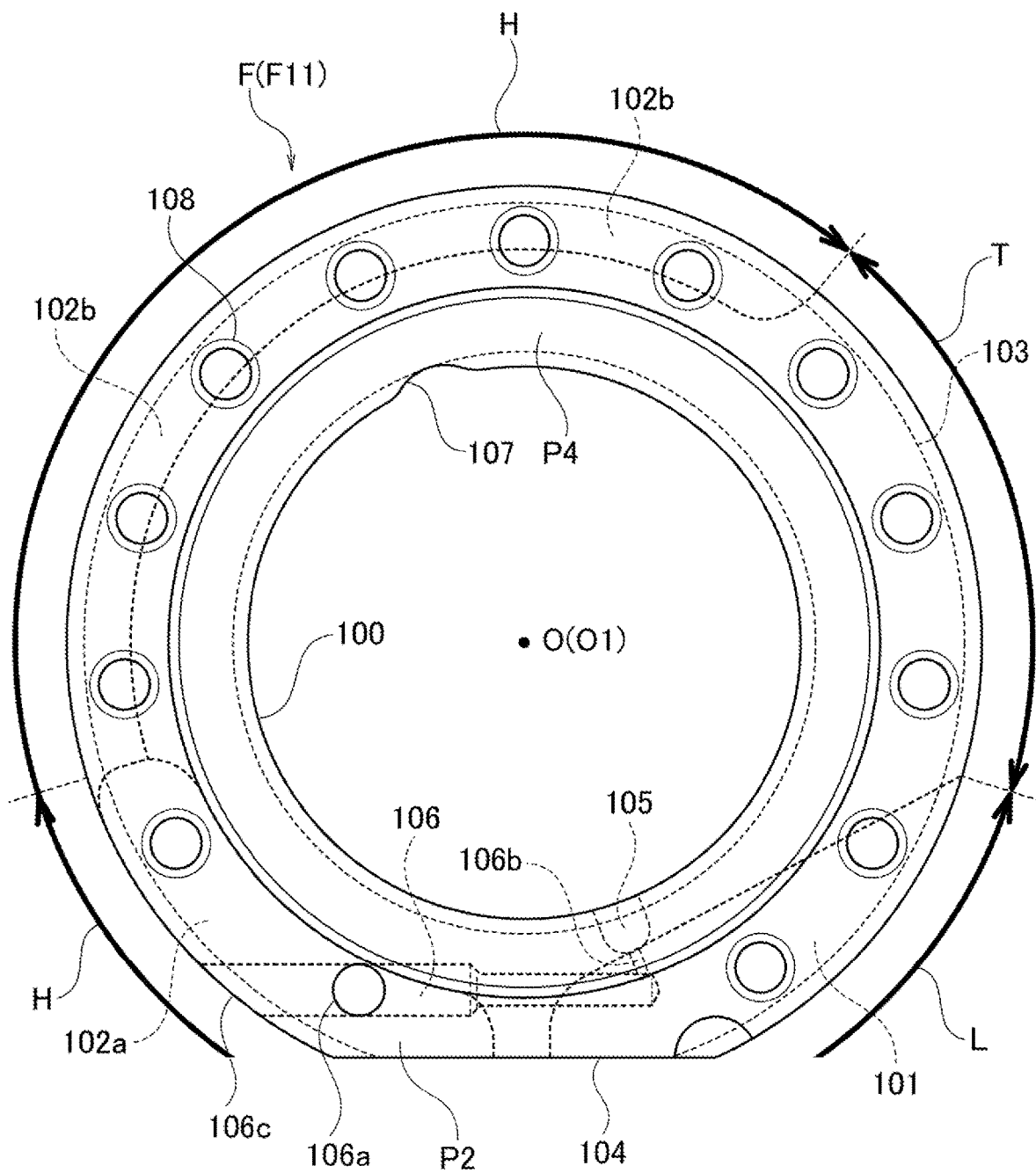
FIG. 6 is a front view of the bushing of the gear pump.

The first bushings F11 and F21 configured symmetrically will be explained with reference to the first bushing F11 shown in FIG. 4 to FIG. 6. The first bushing F11 has a hollow cylindrical shape, and a stepped portion is formed on its outer circumferential surface. A ring-shaped second surface P2 is formed on the stepped portion. In other words, a large diameter portion and a small diameter portion are formed in the first bushing F11 by having the second surface P2 as a border, and an outer diameter of the large diameter portion is the same as a gear outer diameter of the first gear G1 (see FIG. 2). Lubrication grooves 103 that achieve easy sliding of the first bushing F11 in the axial direction of the rotational shaft GS are formed on the outer circumferential surface of the large diameter portion.

A portion of the outer circumferential surface of the large diameter portion of the first bushing F11 is formed as a contact flat face 104. The first bushings F11 and F21 are disposed on a side of the mid plater B3 within the gear accommodation chamber 1 in a state where this contact flat face 104 is planarly contacted with the contact flat face 104 of the first bushing F21 of the second gear G2. Therefore, the first bushings F11 and F21 are accommodated non-rotatably in the gear accommodation chamber 1. The plane containing the contact flat faces 104 is the above-mentioned symmetrical plane of the bushings F11 and F21.

The second surface P2 is a flat surface perpendicular to the rotational shaft GS1 (the rotational axis O1), and is opposed to an after-explained first surface P1 formed on the pump body B (the mid plate B3). An inner diameter of the inner circumferential surface 100 of the first bushing F11 is almost identical to the outer dimeter of the rotational shaft GS1 of the first gear G1, and the lubricating oil film is formed between the inner circumferential surface 100 and the rotational shaft GS1. In other words, the inner circumferential surface 100 slidably contacts with the outer circumferential surface of the rotational shaft GS1 with the lubricating oil film interposed therebetween. A recess 105 that supplies high pressure lubricating oil between the inner circumferential surface 100 and the outer circumferential surface of the rotational shaft GS1 is opened on the inner circumferential surface 100. The recess 105 is disposed at the middle of the inner circumferential surface 100 in the direction of the rotational axis O1 such that the lubricating oil supplied through the recess 105 can spread efficiently between the inner circumferential surface 100 and the outer circumferential surface of the rotational shaft GS1.

The recess 105 has an internal space that has an almost rectangular parallelepiped shape, but its bottom face is formed as a concave surface. The recess 105 is formed by electrically-discharge machining or cutting machining. A bushing-side inlet port 106a that is an inlet port of a flow passage of the high pressure lubricating oil is opened on the above-mentioned second surface P2. Note that a body-side supply passage 5 (see FIG. 7) for supplying the high pressure lubricating oil to the bushing-side inlet port 106a will be explained later in detail. A bushing-side supply passage 106 that communicates the recess 105 with the bushing-side inlet port 106a is formed within the first bushing F11. An orifice 106b whose internal flow diameter is narrowed is formed at an end of the bushing-side supply passage 106 on a side of the recess 105. In addition, the bushing-side supply passage 106 penetrates to the outer circumferential surface of the first bushing F11, and a supplementary port 106c is opened on the outer circumferential surface. By passing the bushing-side supply passage 106 through to the outer circumferential surface of the first bushing F11, the bushing-side supply passage 106 that never inhibits the supply of the high pressure lubricating oil can be easily formed.

Specifically, a portion of the bushing-side supply passage 106 is formed from a position on the outer circumferential surface where the supplementary port 106c is to be opened toward a vicinity of the recess 105 by using a drill having a larger diameter, at first. Subsequently, the bushing-side supply passage 106 is extended to the vicinity of the recess 105 (beneath its bottom) by using a drill having a smaller diameter. Further, the orifice 106b is formed by drill machining with a drill having a much smaller diameter or electrically-discharge machining. The bushing-side supply passage 106 is further formed from a position on the second surface P2 where the bushing-side inlet port 106a is to be formed to the straight flow passage that has been already formed. Note that an order for forming the bushing-side inlet port 106a, the orifice 106b and the supplementary port 106c is not necessarily limited to the above-mentioned order. Furthermore, any one of the recess 105 and the bushing-side supply passage 106 can be formed in advance of the other.

The first bushing F11 has a third surface P3 that faces to the first gear G1. The third surface P3 is also a flat surface perpendicular to the rotational shaft GS1 (the rotational axis O1), and slidably contacts with the side face of the first gear G1 with the lubricating oil film formed therebetween. The low pressure depressed portion 101 is formed from the third surface P3 to the outer circumferential surface and a portion of the contact flat face 104 on a side of the inlet chamber 2I. A concave inner surface of the low pressure depressed portion 101 is a portion of an inner surface of the inlet chamber 2I. The high pressure depressed portion 102a is formed from the third surface P3 to the outer circumferential surface and a portion of the contact flat face 104 on a side of the outlet chamber 2O. A concave inner surface of the high pressure depressed portion 102a is a portion of an inner surface of the outlet chamber 2O. A tapered portion 102b is extended from the high pressure depressed portion 102a along the circumferential direction. The tapered portion 102b forms a tapered surface between the third surface P3 and the outer circumferential surface. The first bushing F11 has a fourth surface P4 that faces to the mid plate B3. The fourth surface P4 is also a flat surface perpendicular to the rotational shaft GS1 (the rotational axis O1).

A pass through groove 107 is also formed on the inner circumferential surface 100 of the bushing F11. One end of the pass through groove 107 on a side of the fourth surface P4 communicates with the low pressure lubricating oil (fuel) in the inlet chamber 2I through the inside of the mid plate B3. The high pressure lubricating oil supplied between the inner circumferential surface 100 of the first bushing F11 (F21) and the rotational shaft GS from the recess 105 is drained from the one end of the pass through groove 107 on the side of the fourth surface P4 (a low pressure side). The pass through groove 107 is formed parallel to the rotational shaft GS1 (the rotational axis O1) along an entire length of the inner circumferential surface 100 from its one end to its other end. An inner surface of the pass through grove 107 is formed as a concave surface. The pass through groove 107 positions on an opposite side to the recess 105 with respect to the rotational axis O1.

Plural (twelve in the present embodiment) spring accommodation holes 108 are formed on the second surface P2 at even intervals along the circumferential direction. The spring accommodation holes 108 are formed parallel to the rotational shaft GS1 (the rotational axis O1). A coil spring 109 is accommodated in each of the spring accommodation holes 108. The coil spring 109 is accommodated in the spring accommodation hole 108 in a state where it is compressed between a spring seat face inside the spring accommodation hole 108 and the first surface P1 (explained later) that faces to the second surface P2. Therefore, the first bushing F11 is urged in a direction away from the first surface P1 by the coil springs 109 (and the high pressure of the lubricating oil). (Note that the coil springs 109 in the spring accommodation holes 108 are not shown in FIG. 1.)

Figure 7:
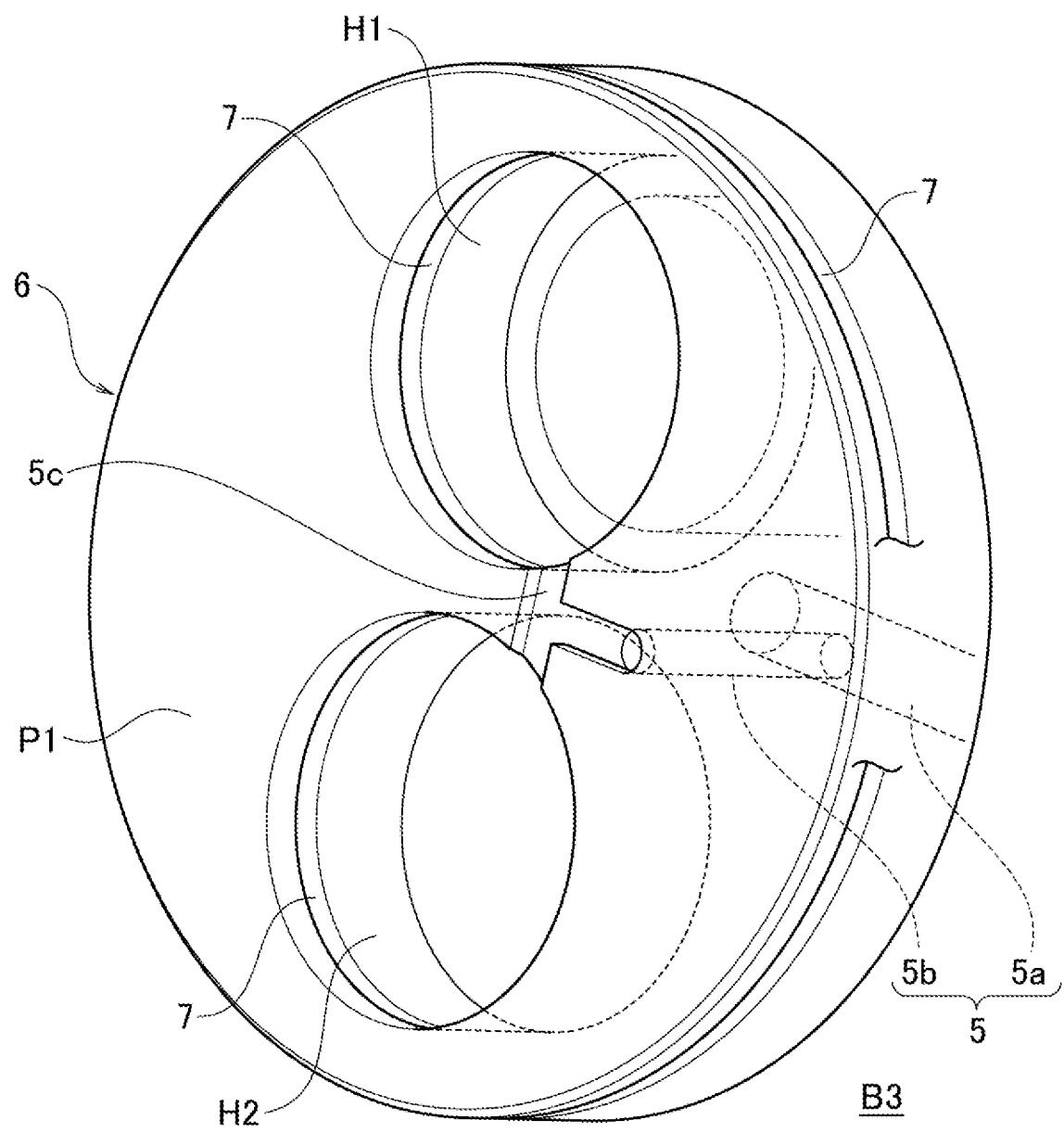
FIG. 7 is a perspective view showing a portion of a mid plate of the gear pump.

As explained above, the second surface P2 of the first bushing F11 (F21) faces to the first surface P1 of the pump body B (the mid plate B3). The first surface P1 is also a flat surface perpendicular to the rotational shafts GS (the rotational axes O). As shown in FIG. 7, the first surface P1 is formed as an end face of a circular protrusion 6 of the mid plate B3. The circular protrusion 6 is protruded from a surface of the mid plate B3 that faces to the main body B1. A first bushing hole H1 that accommodates an end of the first bushing F11 and a second bushing hole H2 that accommodates an end of the first bushing F21 are formed on the first surface P1 of the circular protrusion 6. The first bushing hole H1 is a through hole provided with a step on its inner circumferential surface, and the rotational shaft GS1 of the first gear G1 passes through this through hole. The second bushing hole H2 is a bottomed hole.

The first bushing hole H1 accommodates the small diameter portion of the first bushing F11. Therefore, the second surface P2 that is the border between the small diameter portion and the large diameter portion of the first bushing F11 faces to the first surface P1. Similarly, the second bushing hole H2 accommodates the small diameter portion of the first bushing F21. Therefore, the second surface P2 that is the border between the small diameter portion and the large diameter portion of the second bushing F21 faces to the first surface P1. The above-explained coil springs 109 in the compressed state contact with the first surface P1, and thereby urge the first bushings F11 and F21 in the direction away from the first surface P1.

Seal grooves 7 each accommodates an oil seal that prevents leakage of the lubricating oil are formed on the outer circumferential surface of the circular protrusion 6 and on the inner circumferential surfaces of the first bushing hole H1 and the second bushing hole H2, respectively. The body-side supply passage 5 for supplying the high pressure lubricating oil to the bushing-side inlet ports 106a and a body-side supply port 5c that is an outlet port of the body-side supply passage 5 are also shown in FIG. 7. The body-side supply port 5c (the outlet end of the body-side supply passage 5) in the present embodiment is branched to have a T-shape, and its one end faces to the bushing-side inlet port 106a of the first bushing F11 and its other end faces to the bushing-side inlet port 106a of the first bushing F21. Thus, the body-side supply port 5c faces to both of the bushing-side inlet port 106a of the first bushing F11 and the bushing-side inlet port 106a of the first bushing F21. In addition, the body-side supply port 5c supplies the high pressure lubricating oil also to a minute clearance gap between the first surface P1 and the second surface P2. The high pressure lubricating oil supplied to this minute clearance gap urges the first bushings F11 and F21 together with the coil springs 109.

Hereinbefore, the first bushing F11 (F21) disposed on a side of the mid plate B3 has been explained. In the present embodiment, the second bushing F12 (F22) disposed on a side of the side plate B2 is partially different from the first bushing F11 (F21). No spring accommodation hole 108 is formed on the second surface P2 of the second bushing F12 (F22), and no bushing-side supply passage 106 and so on is formed, either. In addition, the second bushing F12 has an almost symmetrical shape to that of the first bushing F11 with respect to the first gear G1, and the second bushing F22 has an almost symmetrical shape to that of the first bushing F21 with respect to the second gear G2. The high pressure lubricating oil (fuel) in the outlet chamber 2O is supplied to inner circumferential surface 100 of the second bushing F12 (F22) from a high pressure supply passage 4H (see FIG. 1) through the recess 105. On the other hand, the low pressure lubricating oil (fuel) in the inlet chamber 2I is supplied from a low pressure supply passage 4L (see FIG. 1) to the fourth surface P4 of the second bushing F12 (F22) that faces to the side plate B2. The high pressure lubricating oil supplied between the inner circumferential surface 100 of the second bushing F12 (F22) and the rotational shaft GS is discharged from the end of the pass through groove 107 on a side of the fourth surface P4 (a low pressure side). The fourth surface P4 of the second bushing F22 that faces to the side plate B2 and the fourth surface P4 of the first bushing F21 that faces to the mid plate B3 are communicated with each other through the inside of the rotational shaft GS2 of the second gear G2.

The second bushings F12 and F22 are disposed on a side of the side plate B2 in the gear accommodation chamber 1. Here, as explained above, the first bushings F11 and F21 are urged in the direction away from the first surface P1, i.e. toward the pair of the gears G (leftward in FIG. 1). Since the second surfaces P2 of the second bushings F12 and F22 contact with stepped portions of the main body B1, their positions along the direction of the rotational shafts GS (the rotational axes O) are fixed. The pair of the gears G are pushed by the urged first bushings F11 and F21, and thereby their side faces slidably contact with the third surfaces P3 of the second bushings F12 and F22 with the lubricating oil film formed therebetween. The pair of the gears G slidably contacts also with the third surfaces P3 of the urged first bushings F11 and F21 at their opposite side faces. In this manner, the slidable contact state of the gears G, the first bushings F11 and F21, and the second bushings F12 and F22 is made stable.

Note that the lubricating oil can transfer via the oil film formed at the above-mentioned slidable contact portions (between the circumferential faces of the gears G and the pump body B, between the side faces of the gears G and the third surfaces P3, and between the outer circumferential surfaces of the rotational shafts GS and the internal circumferential surfaces 100 of the bushings F), but it can also transfer though the minute clearance gaps between the bushings F and the pump body B. There are high pressure positions and low pressure positions of the lubricating oil (fuel) within the gear pump P, and the lubricating oil tends to transfer from the high pressure positions to the low pressure positions. When stably supplying high pressure lubrication oil to a certain position, the high pressure state at the position can be maintained stably. In the present embodiment, a tolerance against a load acting on (the rotational shafts GS of) the pair of the gears G can be enlarged (i.e. an allowable load can be made large) by stably supplying the high pressure lubricating oil to the internal circumferential surfaces 100. By making the allowable load large, the sliding surfaces can be prevented from galling due to oil shortage even when a large load acts thereon. In addition, in order to make the allowable load large, homogenization of pressure distribution (at high pressure) in the oil films contributes to the stability.

Here, pressure ranges formed in the circumferential direction of the pair of the gears G will be explained with reference to FIG. 3 and FIG. 6. As explained above, the pressure PH in the outlet chamber 2O is higher than the pressure PL in the inlet chamber 2I (PL<PH). Therefore, along the inner circumference of the gear accommodation chamber 1 associating with the outer circumference of the first gear G1 and the second gear G2, a low pressure range L is formed in association with the inlet chamber 2I. This low pressure range L associates with the above-explained low pressure depressed portions 101. On the other hand, along the inner circumference of the gear accommodation chamber 1 associating with the outer circumference of the first gear G1 and the second gear G2, a high pressure range H is formed in association with the outlet chamber 2O. This high pressure range H associates with the above-explained high pressure depressed portions 102a. Here in the present embodiment, the high pressure depressed portions 102a is extended along the circumferential direction by the tapered portions 102*b* as explained above. Therefore, the high pressure range H in the present embodiment is extended to the tapered portions 102*b*.

As explained above, the fuel (lubricating oil) is carried in the circumferential direction in a state where it is held between the gear teeth of the gears G. During this process, the pressure of the fuel (lubricating oil) held between the gear teeth takes a lower pressure within the low pressure range L, and takes a high pressure within the high pressure range H. Pressure transition ranges T in which the pressure of the fuel (lubricating oil) gradually transfers from a low pressure to a high pressure via the lubricating oil film at the slidable contact portions are formed between the low pressure range L and the high pressure range H. The pressure transition ranges T can be also called as pressure rising ranges. In this manner, the low pressure range L, the pressure transition ranges T and the high pressure range H are segmented in association with the outer circumference of the gears G.

In other words, the pressure distribution is formed along the outer circumference of the gears G. Due to this pressure distribution, pressure distribution may be formed in the lubricating oil film between the outer circumferential surface of the rotational shafts GS and the inner circumferential surface 100 of the bushings F. However, in the present embodiment, the high pressure lubricating oil is supplied between the outer circumferential surface of the rotational shafts GS and the inner circumferential surface 100 of the bushings F via the recesses 105. As shown in FIG. 6, the recess(es) 105 is positioned within the low pressure range L. Therefore, it is possible to supply the high pressure lubricating oil to the lubricating oil film within the low pressure range L so as to resolve the above-mentioned pressure distribution in the lubricating oil film. In particular, the recess 105 is disposed on a rotation anterior side of the rotational shaft GS within the low pressure range L, so that the high pressure lubricating oil supplied to the lubricating oil film can be easily supplied to an entire range of the low pressure range L due to the rotations of the rotational shaft GS. In addition, on a side of the third surface P3, the lubricating oil within the low pressure range L may tend to escape to the inlet chamber 2I whose pressure is low (to the low pressure depressed portion 101), but the high pressure lubricating oil is further supplied thereto from the recess 105 to prevent oil shortage.

On the other hand, the bushing-side inlet port(s) 106*a* that is an inlet port of the bushing-side supply passage 106 for supplying the high pressure lubricating oil to the recess 105 is positioned within the high pressure range H. Although the high pressure lubricating oil is introduced through the bushing-side inlet port 106*a*, the bushing-side inlet port 106*a* is positioned within the high pressure range H and thereby the pressure of the lubricating oil never reduces. In addition, the bushing-side inlet port 106*a* is disposed on a rotation posterior side of the rotational shaft GS within the high pressure range H. Here, the bushing-side supply passage 106 that connects the recess 105 within the low pressure range L with the bushing-side inlet port 106*a* within the high pressure range H has a small internal diameter because it is formed within the first bushing F11 (F21), and thereby it may cause pressure loss. However, by disposing the recess 105 on the rotation anterior side within the low pressure range L and disposing the bushing-side inlet port 106*a* on the rotation posterior side within the high pressure range H, the bushing-side supply passage 106 can be formed straight and as short as possible, and thereby it becomes possible to supply the high pressure lubricating oil from the recess 105 while restricting the pressure loss.

In the present embodiment, the bushing-side supply passage 106 passes through to the outer circumferential surface of the first bushing F11, and the supplementary port 106*c* is opened on the outer circumferential surface. According to this, the bushing-side supply passage 106 can be easily formed straight (by drill machining). Since the supplementary port 106*c* is positioned within the high pressure range H, the pressure of the lubricating oil being supplied through the bushing-side supply passage 106 never be reduced. The bushing-side supply passage 106 is intended to connect the bushing-side inlet port 106*a* with the recess 105, and the branched passage continued to the supplementary port 106*c* is not necessarily formed. However, the branched passage continued to the supplementary port 106*c* makes machining for forming the bushing-side supply passage 106 easy, and the supplementary port 106*c* (the branched passage) is not needed to be closed because it never causes the pressure loss.

In addition, the orifice 106*b* formed at the end of the bushing-side supply passage 106 on a side of the recess 105 restricts the lubricating oil in the recess 105 from being pushed back to the bushing-side supply passage 106. In other words, thickness variability, along the circumferential direction, of the oil film formed between the outer circumferential surface of the rotational shaft GS and the inner circumferential surface 100 of the bushing F can be restricted. Therefore, the thickness variability of the lubricating oil film can be restricted, and thereby the allowable load of the rotational shaft GS and the bushing F can be made large.

Figure 8:
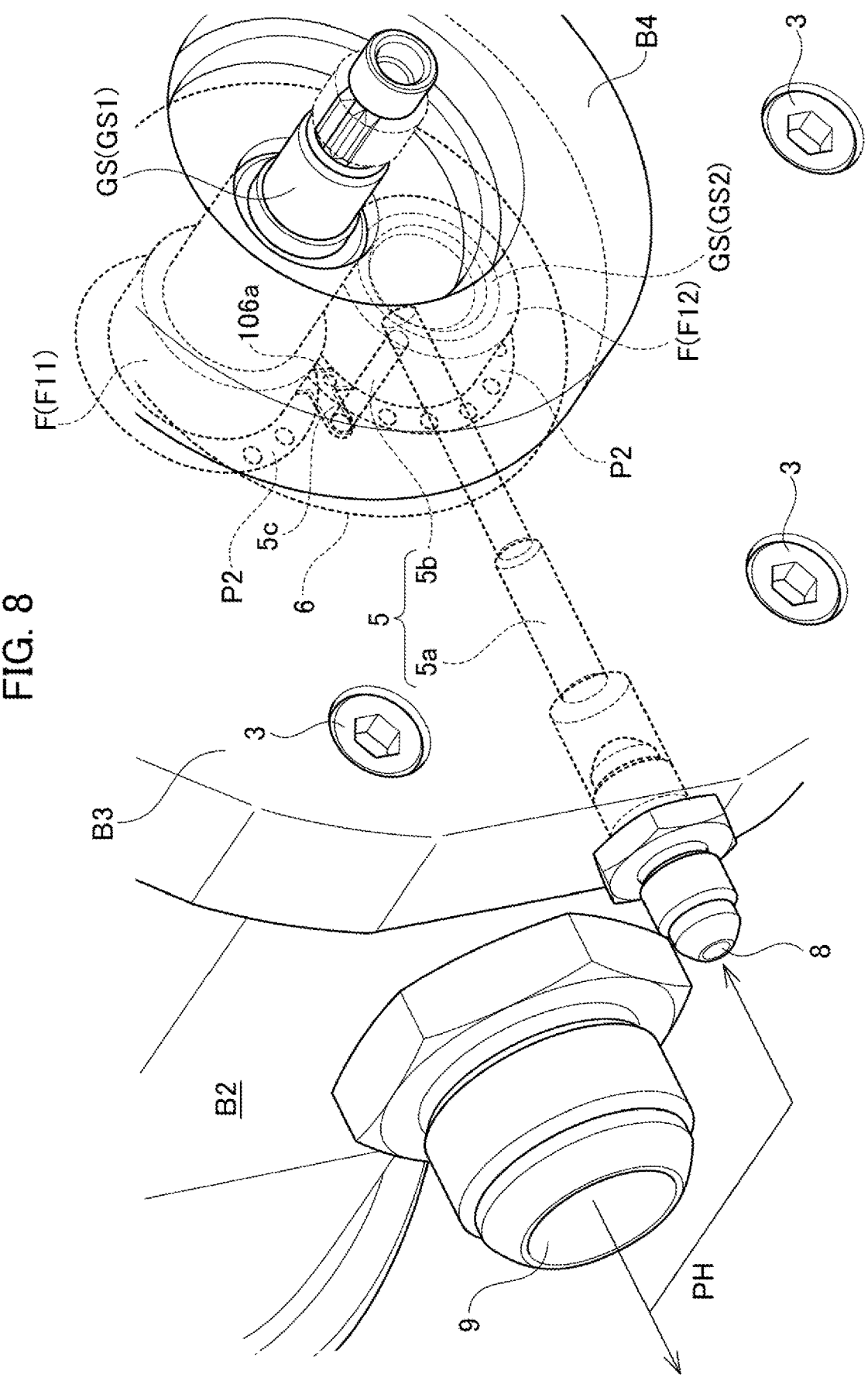
FIG. 8 is a perspective view showing a body-side supply passage of the gear pump.

Next, the body-side supply passage 5 for supplying the high pressure lubricating oil to the bushing-side inlet port 106*a* will be explained with reference to FIG. 8. An inlet port 8 for supplying the high pressure lubricating oil to the body-side supply passage 5 is provided on an outer surface of the pump body B (the mid plate B3). The inlet port 8 is connected with a discharge port 9 from which the high pressure fuel (lubricating oil) in the outlet chamber 2O is discharged by a pipe(s) (not shown in the drawings). A main passage 5*a* of the body-side supply passage 5 is formed straight from the inlet port 8 toward a position on an outer side of the circular protrusion 6 in the axial direction. The main passage 5*a* is formed perpendicular to the rotational shafts GS (the rotational axes O). A supplementary passage 5*b* of the body-side supply passage 5 is connected with an end of the main passage 5*a* (also see FIG. 7). The supplementary passage 5*b* is formed parallel to the rotational shafts GS (the rotational axes O), i.e. perpendicular to the first surface P1 (and the second surface P2). The supplementary passage 5*b* penetrates the circular protrusion 6, and the body-side supply port 5*c* that is an outlet port of the body-side supply passage 5 is formed at an end of the supplementary passage 5*b* as explained above. The body-side supply port 5*c* in the present embodiment is formed flat on the first surface P1 to have a T-shape and faces to both of the bushing-side inlet port 106*a* of the first bushing F11 and the bushing-side inlet port 106*a* of the first bushing F21, as explained above. Note that the body-side supply passage 5 may be formed within the pump body B so as to connect the body-side supply port 5*c* with the outlet chamber 2O (without the inlet port 8).

For forming the body-side supply passage 5, a portion of the main passage 5*a* is formed from a position on the outer face of the mid plate B3 where the inlet port 8 is to be provided toward the position on the outer side of the circular protrusion 6 in the axial direction (and at the middle of the first bushing hole H1 and the second bushing hole H2 when viewed in the axial direction) by using a drill having a large diameter. Subsequently, the main passage 5*a* is extended sequentially by using drills each having a medium diameter and a small diameter. In addition, the supplementary passage 5*b* is drilled from the first surface P1 to the end of the main passage 5*a*. The shape of the opening of the supplementary passage 5*b* (i.e. the body-side supply port 5*c*) on the first surface P1 is formed to have the above-explained T-shape by cutting machining or electrically-discharge machining. The machining process of the body-side supply port 5*c* like this can be also done easily, because it can be done on the first surface P1 that is a flat surface. An order for forming the main passage 5*a*, the supplementary passage 5*b* and the body-side supply port 5*c* is not necessarily limited to the above-mentioned order. Note that the reason why the body-side supply passage 5 and the bushing-side supply passage 106 are formed by gradually narrowing their inner diameter is that it is difficult to machining a long supply passage in a single step by using a small diameter drill. However, a pressure loss can be reduced by the body-side supply passage 5 and the bushing-side supply passage 106 each of whose inner diameters is gradually narrowed.

According to the present embodiment, the recess 105 for supplying the high pressure lubricating oil between the inner circumferential surface 100 of the first bushing F11 (F21) and the outer circumferential surface of the rotational shaft GS1 (GS2) is opened on the inner circumferential surface 100 within the low pressure range L associating with the inlet chamber 2I (the low pressure depressed portion 101). In addition, the bushing-side supply passage 106 (including the orifice 106*b*) for supplying the high pressure lubricating oil to the recess 105 is formed within the first bushing F11 (F21). Further, the bushing-side inlet port 106*a* of the busing-side supply passage 106 is opened on the second surface P2 within the high pressure range H associating with the outlet chamber 2O (the high pressure depressed portion 102*a*) The body-side supply passage 5 for supplying the high pressure lubricating oil to the body-side supply port 5*c* opened on the first surface P1 facing to the second surface P2 is formed within the pump body B (the mid plate B3).

The first surface P1 and the second surface P2 face each other, and the high pressure lubricating oil can be supplied between the first surface P1 and the second surface P2 by the body-side supply passage 5. This high pressure lubricating oil between the first surface P1 and the second surface P2 can be further supplied to the recess 105 on the inner circumferential surface 100 within the low pressure range L by the bushing-side supply passage 106 within the high pressure range H. Therefore, the high pressure lubricating oil can be supplied stably to an entire area between the inner circumferential surface 100 of the first bushing F11 (F21) and the outer circumferential surface of the rotational shaft GS1 (GS2). In addition, the thickness of the lubricating oil film formed between the inner circumferential surface 100 of the first bushing F11 and the outer circumferential surface of the rotational shaft GS1 can be also maintained stably. As the result, the allowable load of the rotational shaft(s) GS and the bushing(s) F can be made large.

Since the minute clearance gap between the first surface P1 and the second surface P2 in the present embodiment doesn't face to the sliding surfaces, the lubricating oil can keep its high pressure along the entire circumference. Further, the first bushing F11 (F21) is urged in the direction away from the first surface P1 in the present embodiment, the minute clearance gap between the first surface P1 and the second surface P2 can be kept wide, albite narrowly, and thereby functions as an accumulation portion of the high pressure lubricating oil. As the result, the high pressure lubricating oil can be supplied stably from the body-side supply port 5*c* to the bushing-side inlet port 106*a*.

According to the present embodiment, the bushing-side inlet port 106*a* on the second surface P2 and the body-side supply port 5*c* on the first surface P1 are arranged so as to face each other. Therefore, the high pressure lubricating oil flowing out through the body-side supply port 5*c* directly flows into the bushing-side inlet port 106*a*, and thereby a pressure loss can be restricted. As the result, the high pressure lubricating oil can be supplied more stably between the inner circumferential surface 100 of the first bushing F11 (F21) and the outer circumferential surface of the rotational shaft GS1.

According to the present embodiment, the body-side supply port Sc is disposed so as to face to both of the bushing-side inlet port 106*a* of the first bushing F11 associating with the first gear G1 and the bushing-side inlet port 106*a* of the first bushing F21 associating with the second gear G2. Since the high pressure lubricating oil can be supplied to the two bushing-side inlet ports 106*a* by the single body-side supply passage 5 (the body-side supply port 5*c*), the rotations of the both rotational shafts GS of the paired gears G can be lubricated while the pressure loss is restricted. In addition, spaces for forming the bushing-side supply passage 106 are little remained in the first bushings F11 and F21, but the lubricating mechanism can be constructed with high space efficiency.

According to the present embodiment, the bushing-side supply passage 106 has the orifice 106*b* at its end on a side of the recess 105. Therefore, the lubricating oil in the recess 105 can be restricted from being pushed back to the bushing-side supply passage 106 by the orifice 106*b*, and thereby the thickness variability, along the circumferential direction, of the oil film formed between the outer circumferential surface of the rotational shaft GS and the inner circumferential surface 100 of the bushing F can be restricted. As the result, the allowable load of the rotational shaft GS and the bushing F can be made large by restricting the thickness variability of the lubricating oil film.

According to the present embodiment, the bushing-side supply passage 106 passes through to the outer circumferential surface of the first bushing F11 (F21). Therefore, the bushing-side supply passage 106 can be formed straight easily (by drill machining, for example), and thereby the pressure loss in the bushing-side supply passage 106 can be restricted. Although the supplementary port 106*c* is opened on the outer circumferential surface within the high pressure range H, it never reduces the pressure of the lubricating oil and thereby it is not needed to close the supplementary port 106*c*. In view of this point, the bushing-side supply passage 106 can be formed easily.

According to the present embodiment, the plural spring accommodation holes 108 each of which accommodates the coil spring 109 for urging the first bushing F11 (F21) in the direction away from the first surface P1 are formed. As the result, it becomes possible to accumulate the high pressure lubricating oil in the minute clearance gap between the first surface P1 and the second surface P2, and thereby the first bushing F11 (F21) can be urged stably by the high pressure lubricating oil together with the coil springs 109. The third surface P3 of the urged first bushing F11 (F21) slidably contacts with the side face of the gear G with the lubricating oil film interposed therebetween, but their slidable contact state can be made stable. As the result, the lubrication can be made stable, and the discharge of the fluid by the gear pump P can be also made stable.

According to the present embodiment, the pass through groove 107 that is connected with the low pressure lubricating oil is formed on the inner circumferential surface 100 on the opposite side to the recess 105. Therefore, the high pressure lubricating oil can be drained stably by the pass through groove 107. Therefore, the sliding surface (the third surface P3) of the first bushing F11 (F21) can be cooled effectively, and thereby the temperature rise of the first bushing F11 (F21) can be restricted. In addition, the thickness variability of the lubricating oil film can be restricted, and thereby the allowable load of the rotational shaft GS and the bushing F can be made large.

What is claimed is:

1. An external gear pump that increases a pressure of fluid and discharge the fluid, the pump comprising:
    a pair of a first gear and a second gear;
    a pump body;
    a gear accommodation chamber that is formed within the pump body and accommodates the first gear and the second gear in a meshed state:
    a pair of a first bushing and a second bushing that are hollow cylindrical and hold a rotational shaft of the first gear rotatably;
    an inlet chamber that is formed within the pump body on one side of a meshed portion of the first gear and the second gear; and
    an outlet chamber that is formed within the pump body on another side of the meshed portion,
    wherein a low pressure range facing to the inlet chamber and a high pressure range facing to the outlet chamber are segmented along an inner circumference of the gear accommodation chamber that associates with an outer circumference of the first gear,
    wherein the pump body has a first surface that faces the first bushing and is perpendicular to the rotational shaft of the first gear,
    wherein the first bushing has a second surface that faces the first surface and is perpendicular to the rotational shaft,
    wherein a recess for supplying lubricating oil between an inner circumferential surface of the first bushing and an outer circumferential surface of the rotational shaft is opened on the inner circumferential surface within the low pressure range,
    wherein a bushing-side supply passage that connects a bushing-side inlet port opened on the second surface within the high pressure range with the recess is formed within the first bushing, and
    wherein a body-side supply passage that connects the outlet chamber with a body-side supply port opened on the first surface within the high pressure range is formed within the pump body.

2. The external gear pump according to claim 1, wherein the bushing-side inlet port and the body-side supply port are arranged so as to face each other.

3. The external gear pump according to claim 2, wherein a rotational shaft of the second gear is also rotatably held by a first bushing and a second bushing that are hollow cylindrical,
    wherein the first bushing of the second gear is configured symmetrically to the first bushing of the first gear with respect to a symmetrical plane that is located at a center between the first gear and the second gear and is parallel to the rotational shaft, and
    wherein the body-side supply port is disposed so as to face to both of the bushing-side inlet port of the first bushing of the first gear and a bushing-side inlet port of the first bushing of the second gear.

4. The external gear pump according to claim 1, wherein an orifice is formed at an end of the bushing-side supply passage on a side of the recess.

5. The external gear pump according to claim 1, wherein the bushing-side supply passage is passed through to an outer circumferential surface of the first bushing.

6. The external gear pump according to claim 1, wherein a plurality of spring accommodation holes is formed on the second surface of the first bushing of the first gear, each of the spring accommodation holes accommodating a coil spring that urges the first bushing in a direction away from the first surface facing to the second surface.

7. The external gear pump according to claim 1, wherein a pass through groove is formed on the inner circumferential surface of the first bushing of the first gear from one end to another end of the inner circumferential surface at an opposite position to the recess with respect an axial center of the rotational shaft.

* * * * *